United States Patent [19]

Brown

[11] Patent Number: 5,181,386
[45] Date of Patent: Jan. 26, 1993

[54] CRYOGENIC COOLING APPARATUS

[75] Inventor: Keith Brown, Worcestershire, England

[73] Assignee: The Hymatic Engineering Company Limited, Worcestershire, England

[21] Appl. No.: 741,130

[22] Filed: Aug. 7, 1991

[51] Int. Cl.$^5$ .............................................. F25B 19/02
[52] U.S. Cl. .................................. 62/51.2; 137/513.3; 251/117
[58] Field of Search ...................... 62/51.2; 137/513.3; 251/117

[56] References Cited

U.S. PATENT DOCUMENTS

| 3,747,365 | 7/1973 | Nicholds | 62/51.2 |
| 4,245,636 | 1/1981 | Sparks et al. | 251/117 |
| 4,263,787 | 4/1981 | Domingorena | 137/513.3 |

FOREIGN PATENT DOCUMENTS 1431333  4/1976  United Kingdom .

Primary Examiner—Ronald C. Capossela
Attorney, Agent, or Firm—Hubbard, Thurman, Tucker & Harris

[57] ABSTRACT

Cryogenic cooling apparatus comprising an inlet path through which refrigerant gas is caused to flow, a Joule-Thomson expansion nozzle which communicates with the inlet path and in which, in use, a proportion of the refrigerant gas is caused to liquefy and an outlet path communicating with the outlet of the expansion nozzle, the inlet path being in heat exchange relationship with the outlet path. An elongate valve needle cooperates with the outlet side of the expansion nozzle and together with the latter constitutes a valve. A sensor is disposed in the space on the outlet side of the expansion nozzle and is arranged progressively to close the valve as the amount of liquid refrigerant in contact with it increases. The valve needle defines a bypass passage which extends along its entire length and remains open at all times. The apparatus is accommodated within a container, to the outer surface of a portion of the wall of which a thermal load is connected. The outlet end of the bypass passage is directed towards the portion of the container wall carrying the thermal load and thus ensures that the refrigerant in the vicinity of the said portion is maintained in a state of agitation at all times.

3 Claims, 1 Drawing Sheet

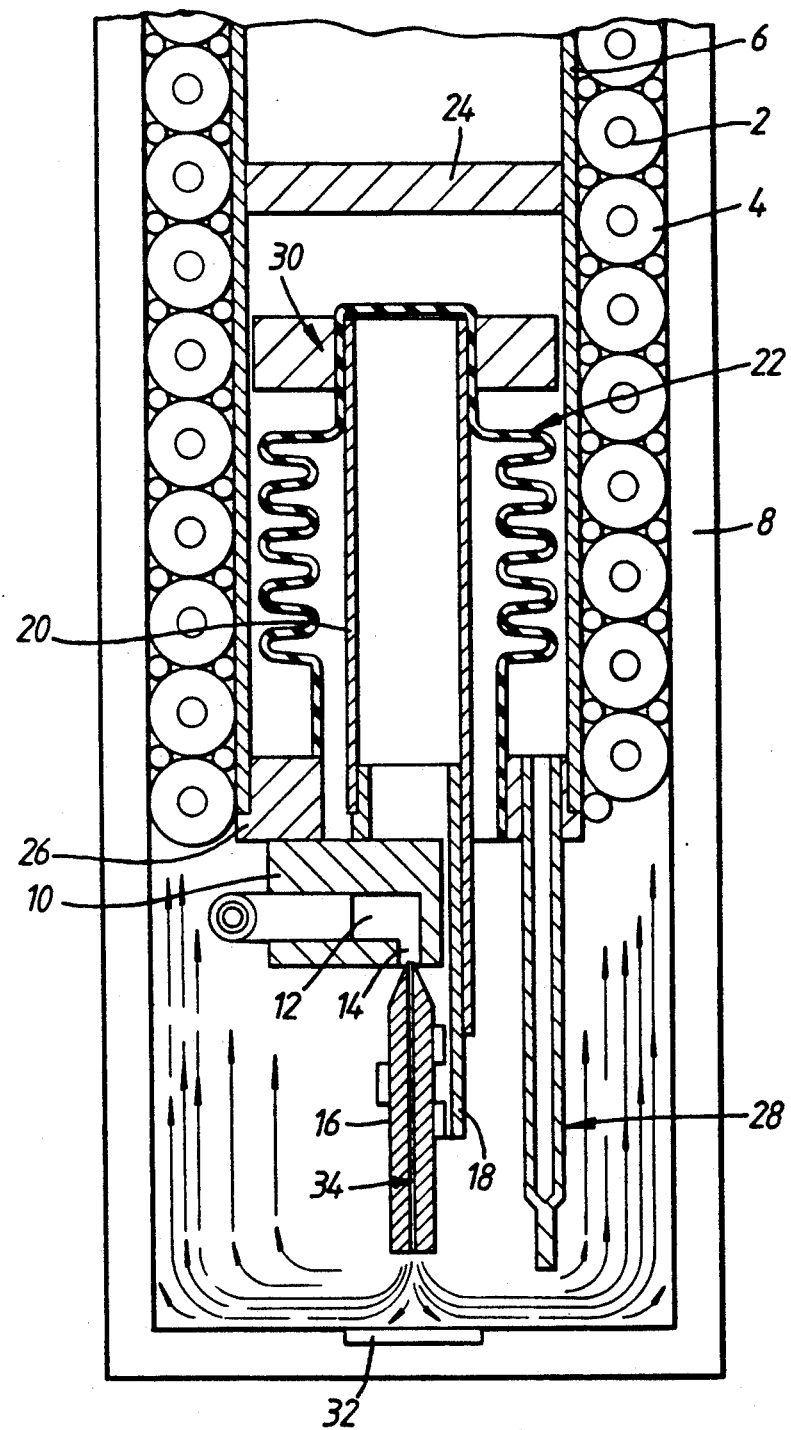

CRYOGENIC COOLING APPARATUS

The present invention relates to cryogenic cooling apparatus of the type which is adapted to cool a load, such as the active element of an infrared detector, to a cryogenic temperature. The invention is concerned with cooling apparatus of the type which includes a Joule-Thomson cooler, i.e. a cooler including two pathways through one of which refrigerant gas is supplied under pressure to a Joule-Thomson expansion nozzle whereafter the gas flows through the other pathway which is in heat exchange relationship with the first pathway thereby cooling the incoming gas.

Such cooling apparatus is frequently of so-called self-regulating type, e.g. as disclosed in GB-A-2085139, in which the expansion nozzle is regulated by a valve member which is moved in response to the presence of liquefied refrigerant on a sensor positioned in the space into which fluid flowing through the expansion nozzle passes. The sensor is not responsive to temperature as such, since the temperature of liquefied droplets of refrigerant formed in the nozzle is the same as that of the gas which flows through the nozzle and remains unliquefied but is responsive to the amount of liquid refrigerant formed in the nozzle and/or present in the space downstream of the nozzle since the rate of heat extraction from the sensor by liquid refrigerant is higher than that of gaseous refrigerant.

The cooler is generally accommodated within a Dewar vessel to the outer surface of whose inner wall is connected the load which is cooled by conduction through the inner wall. It has been found that many cryogenic coolers suffer from "overcooling" whereby when sufficient liquid refrigerant is being produced and/or is present in the space downstream of the nozzle the valve is caused intermittently to close completely rather than being throttled down to reduce the gas flow rate. When the gas is flowing through the nozzle the gas and/or liquid refrigerant in the space downstream of the nozzle is maintained in a state of turbulence but when the nozzle is closed completely the refrigerant in the space downstream of the nozzle becomes relatively calm. The rate of heat extraction from the load has been found to be dependent not only on the amount of liquid refrigerant contacting the wall to which the load is connected but also whether or not this liquid is moving or stationary.

It has therefore been found that the rate of heat extraction from the load and thus the temperature of the load vary in accordance with whether the valve is open or closed even after the steady state operating condition has been reached. In the past this temperature variation has been tolerable because the active element of the load, which was typically made of indium antinomide or cadmium mercuric telluride (CMT) was insensitive to small variations in temperature. However, active elements of photo-voltaic CMT have increasingly been used which are much less tolerant of even relatively small changes in temperature and it is now frequently found that due to the overcooling phenomenon referred to above and the resulting intermittent complete closure of the valve the sensitivity of the infrared detector may vary unacceptably.

British Patent No. 1431333 discloses cooling apparatus of the type referred to above in which a small bypass passage is formed in the movable valve needle, which passage opens through the point of the needle and then has a right angle bend and opens also through the side surface of the needle. In this construction, even when the valve is normally closed and the needle valve is secured seated against the edge of the expansion nozzle there is still a minimum flow of refrigerant gas through the bypass passage. The purpose of the bypass passage is to minimise fluctuations in the flow rate of the refrigerant but it does little to reduce the unacceptable temperature variations of the load referred to above.

It is thus the object of the invention to provide cryogenic cooling apparatus of the type referred to above in which the overcooling phenomenon is eliminated and the rate of heat extraction from the load remains constant once the steady state operating condition has been reached.

According to the present invention cryogenic cooling apparatus comprises an inlet path through which, in use, refrigerant gas is caused to flow, a Joule-Thomson expansion nozzle which communicates with the inlet path and in which, in use, a proportion of the refrigerant gas is caused to liquefy, an outlet path communicating with the outlet of the expansion nozzle, the inlet path being arranged in heat exchange relationship with the outlet path, an elongate valve needle cooperating with the outlet side of the expansion nozzle and together with the latter constituting a valve, a sensor disposed in the space on the outlet side of the expansion nozzle and arranged progressively to close the valve as the amount of liquid refrigerant in contact with it increases, the valve needle affording a bypass passage which extends along its length and remains open at all times, the apparatus being accommodated within a container, to the outer surface of a portion of the wall of which a thermal load is connected, the outlet end of the bypass passage being directed towards the said portion of the container wall.

Thus in the apparatus in accordance with the invention, the valve does not have only a single passage or nozzle controlled by a valve needle, as is usual, but instead has a nozzle controlled by a valve needle and a further bypass passage within the valve needle which remains open at all times and is directed towards that portion of the wall of the container which carries the thermal load. The cross-sectional area of the bypass passage will be smaller than that of the nozzle, typically between 1% and 40%, more particularly 1% and 5%, of that of the nozzle. When the valve is fully open, e.g. during the initial cooling down phase of the apparatus, refrigerant gas flows through both the nozzle and the bypass passage. When the nozzle is fully closed by the valve needle, e.g. if the "overcooling" phenomenon should occur, no gas passes through the nozzle but gas still continues to flow through the bypass passage.

This means that the gaseous and/or liquid refrigerant in the space downstream of the valve adjacent the thermal load is maintained in a constant state of agitation which in turn means that even if the valve is fully closed the rate of heat extraction from the thermal load remains constant. In practice, once the initial cool down phase has been completed it is likely that the rate of refrigerant supply through the bypass passage will be sufficient to maintain the cooling apparatus in the steady state condition and that the valve will for the most part remain fully closed. However, if the rate of thermal extraction from the cooler should increase, for instance due to an increase in ambient temperature or an increase in the thermal load, the valve will open somewhat under the normal modulating control of the self-regulating mechanism to permit an increased flow of refrigerant.

In order to control the valve the expansion nozzle may be fixed and the valve needle movable or vice versa. In the former case, which is preferred, the valve needle may be carried by a holder which is arranged to be moved as the amount of liquid refrigerant contacting the sensor varies.

The expansion nozzle or the valve needle may be moved by any of the means which are conventionally used for this purpose, e.g. a bellows or an expansible rod.

The cooling apparatus is accommodated within a container, typically a Dewar vessel, and the thermal load is connected to the outer surface of a portion of the wall of this container. The flow of gas through the bypass passage will maintain the liquid and gaseous refrigerant adjacent the portion of the wall to which the thermal load is connected in a state of agitation and the degree of agitation is maximised at the position where it is required by the fact that the bypass passage extends over the entire length of the valve needle and the outlet end of the bypass passage is directed towards the portion of the container wall to which the thermal load is connected.

Further features and details of the present invention will be apparent from the following description of one specific embodiment which is given by way of example with reference to the accompanying diagrammatic drawing which is a longitudinal sectional view through a self-regulating Joule-Thomson cooler in accordance with the invention.

The cooler includes a generally tubular heat exchanger comprising a tube 2 which carries fins 4 and is wound on a former 6 and accommodated within a Dewar vessel 8. Connected to the downstream end of the coiled tube 2 is a nozzle block 10 defining a space 12 which communicates with the interior of the coiled tube 2 and with the space within the Dewar vessel via a Joule-Thomson expansion nozzle 14. Cooperating with the downstream side of the nozzle 14 is a valve needle 16 which is carried by a needle holder 18 which is in turn connected to a tube 20 whose upper end is connected to a bellows 22. The bellows 22 is accommodated in a sealed space within the former 6, the upper end of which space is sealed by a bung 24 and the lower end of which is sealed by a bung 26 to which the lower end of the bellows 22 is connected.

Extending into the space within the Dewar vessel downstream of the expansion nozzle 14 is an elongate, hollow sensor 28 whose interior communicates with the sealed space within the former 6. Connected to the top of the bellows 22 is a disc 30 whose edges are closely adjacent to the internal surface of the former 6 and which thus ensures that as the bellows 22 move longitudinally within the former they are retained coaxial with it. Connected to the outer surface of the inner wall of the Dewar vessel 8, is a thermal load 32 which comprises the active element of photo-voltaic cadmium mercuric telluride of an infrared detector and which is situated generally in line with the valve needle 16.

The cryogenic cooler as so far described is of generally conventional type. In use, pressurised gas, such as nitrogen or argon, is introduced from a supply (not shown) into the coiled tube 2 whence it passes into the nozzle chamber 12 and then through the expansion nozzle 14 in which it is cooled. The cooled refrigerant gas then passes into the space within the Dewar vessel downstream of the nozzle 14 and then flows, e.g. to atmosphere, through a pathway defined between the Dewar vessel and the former 6 past the finned tube 2. The returning gas cools the inflowing gas within the tube 2 and the temperature of the gas leaving the expansion nozzle 14 thus sinks progressively until a proportion of it liquefies within the nozzle in the form of droplets entrained in the stream of gas. The valve constituted by the expansion nozzle 14 and valve needle 16 is initially fully open but as the depth of the pool of liquefied refrigerant in the Dewar vessel and/or the concentration of droplets of liquefied refrigerant in the vicinity of the sensor 28 increases, the rate of heat extraction from the sensor 28 increases also and thus the pressure in the sensor 28 and thus in the sealed space within the former progressively falls. This reduction in pressure results in expansion of the bellows 22 and thus movement of its upper end upwardly, as seen in the drawings. This upward movement is transmitted via the tube 20 and needle holder 18 to the valve needle 16 which thus progressively throttles the expansion nozzle 14. In the steady state condition, the valve is maintained throttled or fully closed depending on the amount of liquid refrigerant in contact with the sensor 28.

In order to avoid the problem discussed above of the temperature sensor becoming "overcooled" thereby intermittently preventing any flow of gas into the space downstream of the nozzle 14, which would result in the gas and liquid in this space becoming temporarily relatively calm and thus the rate of heat extraction from the load being temporarily reduced, the valve is provided with a bypass passage. In this case, the bypass passage is provided in the form of an elongate passage 34 extending along the length of the valve needle. The cross-sectional area of the bypass passage is considerably smaller than that of the expansion nozzle 14 and its downstream end is closely adjacent to and directed against that portion of the wall of the Dewar vessel to which the thermal load 32 is connected. When the valve is open, the flow of refrigerant gas through it is increased by the presence of the bypass passage 34, but only to a relatively small extent. However, if the valve should be fully closed, due to the fact that the sensor 28 has become "overcooled" or some other reason, refrigerant continues to flow through the bypass passage 34. This means that even when the valve is fully closed the production of liquid refrigerant continues, albeit at a reduced rate, and, more importantly, that the gaseous and liquid refrigerant in the vicinity of the portion of the wall of the Dewar vessel to which the thermal load 32 is connected is maintained in a constant state of agitation whereby the rate of extraction of heat from the thermal load remains substantially constant regardless of the extent to which the valve is open once the steady state operating condition has been reached. If the rate of heat extraction from the Dewar vessel should increase for any reason, the amount of liquid refrigerant in contact with the sensor 28 will decrease whereby the self-regulating mechanism of the cooler will ensure that the valve is opened again whereby the rate of increase of liquid refrigerant is increased until a balance is again reached.

Obviously, numerous modifications and variations of the present invention are possible in the light of the above teachings. It is therefore to be understood that within the scope of the appended claims, the invention may be practiced otherwise than as specifically described herein.

What is claimed as new and desired to be secured by letters patent of the United States is:

1. Cryogenic cooling apparatus, said apparatus being accommodated within a container which has a wall, a thermal load being connected to the outer surface of a portion of said wall, said apparatus comprising an inlet path through which, in use, refrigerant gas is caused to flow, a Joule-Thomson expansion nozzle which has an outlet and communicates with said inlet path and in which, in use, a proportion of said refrigerant gas is caused to liquefy, an outlet path communicating with said outlet of said expansion nozzle, said inlet path being arranged in heat exchange relationship with said outlet path, an elongate valve needle cooperating with the outlet side of said expansion nozzle and together with the latter constituting a valve, a sensor disposed in a space on the outlet side of said expansion nozzle and arranged progressively to close said valve as the amount of liquid refrigerant in contact with it increases, said valve needle affording a bypass passage which extends over its entire length and remains open at all times, said bypass passage having an outlet end which is directed towards said portion of said wall.

2. Apparatus as claimed in claim 1 which includes a holder and wherein said expansion nozzle is fixed and said valve needle is carried by said holder which is arranged to be moved as the amount of liquid refrigerant contacting said sensor varies.

3. Apparatus as claimed in claim 2 which includes a bellows and a gas space and said sensor defines a sensing space, said holder being connected to said bellows, said bellows being received within said gas space and said gas space communicating with said sensing space, whereby as the amount of liquid refrigerant in contact with said sensor increases the pressure within the said gas and sensing spaces decreases and said bellows expands to move said valve needle towards said expansion nozzle.

* * * * *